United States Patent
Kahlon et al.

(10) Patent No.: US 8,136,098 B2
(45) Date of Patent: Mar. 13, 2012

(54) USING PUSHDOWN SYSTEMS FOR THE STATIC ANALYSIS OF MULTI-THREADED PROGRAMS

(75) Inventors: Vineet Kahlon, Plainsboro, NJ (US); Aarti Gupta, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 1217 days.

(21) Appl. No.: 11/777,129

(22) Filed: Jul. 12, 2007

(65) Prior Publication Data

US 2008/0086722 A1    Apr. 10, 2008

Related U.S. Application Data

(60) Provisional application No. 60/807,080, filed on Jul. 12, 2006.

(51) Int. Cl.
    *G06F 9/44*    (2006.01)

(52) U.S. Cl. ..................................................... 717/131
(58) Field of Classification Search .......... 717/104–105, 717/124–133
See application file for complete search history.

(56) References Cited

U.S. PATENT DOCUMENTS 7,703,077 B2 *  4/2010  Rehof et al. .................. 717/127
7,779,382 B2 *  8/2010  Rehof et al. .................. 717/104

OTHER PUBLICATIONS

Schwoon, "Model-Checking Pushdown Systems", 2002, Technischen Universitat Munchen, pp. 1-202.*
Quadeer et al., "Context-Bounded Model Checking of Concurrent Software", 2005, Springer-Verlag Berlin Heidelberg, pp. 93-107.*

* cited by examiner

*Primary Examiner* — Ted T Vo
(74) *Attorney, Agent, or Firm* — Jeffrey Brosemer; Joseph Kolodka

(57) ABSTRACT

A static, inter-procedural dataflow analysis is used to debug multi-threaded programs which heretofore have been thought unsuitable for concurrent multi-threaded analysis.

6 Claims, 3 Drawing Sheets

FIG. 1

```
Locks: a,b,c foo_nested() {         bar() {                foo_non_nested(){
    acquire(a);            release(b);            acquire(b);
    acquire(b);            release(a);            acquire(a);
    bar();                 acquire(c);            bar();
    release(c);        }                          release(c);
}                                             }
```

```
thread_one() {

1a:  lock(a);
2a:  lock(c);
3a:  unlock(c);
4a:  -----;
5a:  lock(b);
6a:  unlock(b);
7a:  -----;
8a:  unlock(a);
9a:  -----;
}
```

*FIG. 2A*

```
thread_two() {

1a:  lock(c);
2a:  lock(b);
3a:  unlock(b);
4a:  -----;
5a:  lock(a);
6a:  unlock(a);
7a:  -----;
8a:  unlock(c);
9a:  -----;
}
```

*FIG. 2B*

USING PUSHDOWN SYSTEMS FOR THE STATIC ANALYSIS OF MULTI-THREADED PROGRAMS

CROSS REFERENCE TO RELATED APPLICATIONS

This application claims the benefit of U.S. Provisional Application No. 60/807,080 filed Jul. 12, 2006 the entire contents of which are incorporated by reference as if set forth at length herein.

FIELD OF THE INVENTION

This invention relates generally to the field of software development and analysis and in particular to a method for the inter-procedural dataflow analysis of concurrent software.

BACKGROUND OF THE INVENTION

Multi-threading is a powerful technique for exploiting the inherent parallelism in contemporary computer systems. As a result, the use of concurrent multi-threaded programs is pervasive. Examples of multi-threaded programs include operating systems, databases and innumerable embedded systems e.g., cellular telephones, consumer electronics. Given their importance, the ability to analyze, debug and verify multi-threaded programs is of great interest.

As known by those skilled in the art common verification techniques do not scale adequately for the verification of large scale multi-threaded programs. As a result, techniques that permit their verification would represent a significant advance in the art.

SUMMARY OF THE INVENTION

An advance is made in the art according to the principles of the present invention in which a static, inter-procedural dataflow analysis is used to debug multi-threaded programs. And while inter-procedural dataflow analysis has been used with success for finding bugs in sequential programs—it has been generally believed—prior to the present invention—that it was not suitable for multi-threaded programs.

According to an aspect of the invention—interacting pushdown systems—are employed in the multi-threaded, concurrent domain and interact via locks, rendezvous (Wait-Notify( )) and broadcasts (WaitNotifyAll( )).

As a result, the present invention effectively extends inter-procedural analysis to a concurrent domain thereby providing a more realistic model of communication among threads.

Viewed from one aspect the present invention is faster than existing techniques as its time complexity is substantially polynomial in the size of the given concurrent program.

Viewed from another aspect the present invention is more scalable, i.e., it may verify a larger program than existing techniques as it avoids construction of global state space of the given program thereby avoiding a state explosion. Advantageously, the analysis performed is reduced from a concurrent multi-threaded program to its individual threads.

Viewed from yet another aspect the present invention is both sound and complete thereby avoiding bogus errors that may be generated by prior art model checking methods which is particularly significant as a large amount of resources go into detecting/avoiding bogus error traces.

Finally, the present invention may be incorporated into existing tool flows thereby enhancing its attractiveness.

Importantly—and in sharp contrast to the teachings of the prior art—the analysis is carried out individually on each thread represented by a pushdown system, rather than on the entire multi-threaded program.

The details of one or more embodiments of the invention are set forth in the accompanying drawings and the description below. Other features, objects and advantages of the invention will be apparent from the description, drawings and claims.

BRIEF DESCRIPTION OF THE DRAWING

A more complete understanding of the present invention may be realized by reference to the accompanying drawing in which:

FIG. 1 shows program segments depicting nested vs. non-nested lock access;

FIGS. 2(A) and 2(B) are program segments of two threads $T_1$ and $T_2$, respectively.

DETAILED DESCRIPTION

Figure 3:
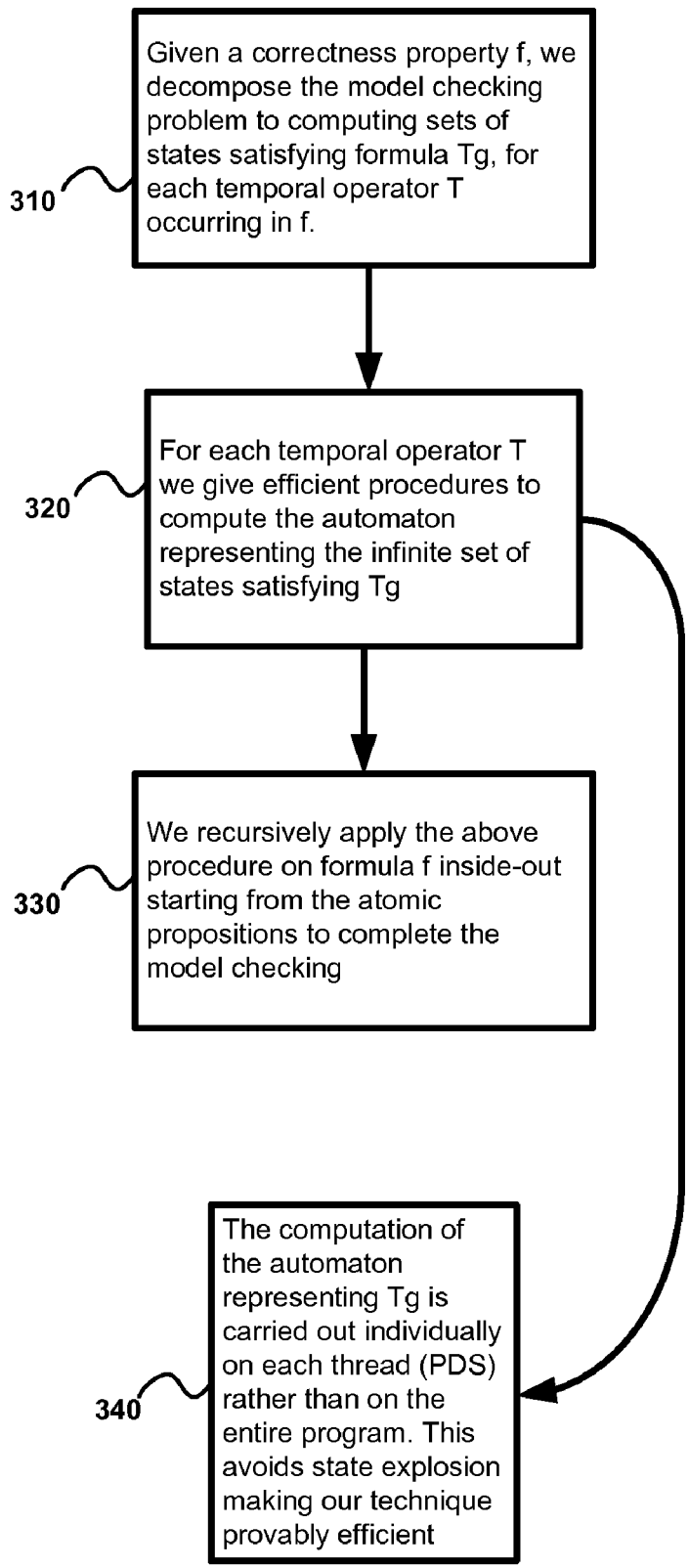
FIG. 3 is a flowchart depicting the method of the present invention.

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

The following references may provide additional useful background information for which purposes they are incorporated herein by reference.[1] Joint cav/issta special event on specification, verification, and testing f concurrent software. In [2] Ahmed Bouajjani, Javier Esparza, 'and Oded Maler. Reacliability analysis of pushdown automata: Application to model-checking. In *CONCUR*, LNCS 1243, pages 135-150, 1997; [3] Ahmed Bouajjani, Javier Esparza, and Tayssir Touili. A generic approach to the static analysis of concurrent programs with procedures. In *IJFCS*, volume 14(4). pages 551, 2003. [4] E. A. Emerson. Temporal and Modal Logic. In *Handbook of Theoretical Computer Science*, Volume B, pages 997-1072, 1998; [5] J. Esparza and S. Schwoon. A bdd-based model checker for recursive program. In CAV, pages 324-336, 2001; [6] P. Godefroid. Model checking for programming languages using verisoft. In *POPL*, pages 174-186, 1997; [7] P. Godefroid and P. Wolper. Using partial orders for efficient verification of deadlock-freedom and safety properties. In *Formal Methods in Systems Design*, pages 149-164, 1993; [S] T. Henzinger, R. Jhala, R. Mazumdar, and S. Qadeer. Thread-modular abstraction refinement. In *CAV*. LXCS 2725, pages 262-274.2003; [9] J. E. Hopcroft and J. D. Ullman. In *Introduction to Automata Theory, Languages and Computation*, 1979; [10] F. IvanEiC. Z. h g, M. Ganai, A. Gupta. and P. Ashar. Efficient SAT-based bounded model checking for software verification. In *Symposium on Leveraging Applications of Formal Methods*, 2004; [11] V. Kahlon and A. Gupta. An Automata-Theoretic Approach for Model Checking Threads for LTL Properties. In *21st Annual IEEE Symposium on Logic in Computer Science (LICS)*, 2006; [12] V. Kahlon, F. IvanEiC, and A. Gupta. Reasoning about threads communicating via locks. In *17th International Conference on Computer Aided Verification (CAW)*, 2005; [13] S. Qadeer, S. K. Rajamani, and J. Rehof. Summarizing procedures in concurrent programs. In *POPL*, pages 245-255, 2004; [14] S. Qadecr and J. Rehof Context-bounded model checking of concurrent software. In *TACAS*, 2005; [15] G. Ramalingam. Context-sensitive synchronization-sensitive analysis is undecidable. In *ACM Trans. Progmm. Lung. Sy.st.*, volume 22(2), pages 416-430, 2000; [16] T. W. Reps, S. Hotwitz, and S. Sagiv. Precise interprocedural dataflow analysis via graph reachability. In *POPL*, pages 49-61, 1985; [17] D. A. Schmidt and B. Steffen. Program analysis as model checking of abstract interpretations. In *Static Analysis, 5th International Symposium*, LNCS 1503, pages 351-380, 1998; [18] S. D. Stoller. Model-checking multi-threaded distributed jam programs. In *STTT*, volume 4(1), pages 71-91, 2002; [19] W. Visser, K. Havelund, G. P. Brat, S. Park, and F. Lerda. Model checking programs. In *Automated Software Engineering*, volume 10(2), pages 203-232, 2003; and [20] I. Walukeiwicz. Model checking ctl properties of pushdown systems In *FSTTCS*, LNCS 1974, pages 127-1 38, 2000.

According to the present invention, model checking is applied to Pushdown Systems (PDS) interacting via standard communication primitives—locks, pairwise and asynchronous rendezvous, and broadcasts.

As is known to those skilled in the art, locks are primitives commonly used to enforce mutual exclusion. On the other hand, Asynchronous Rendezvous and Broadcasts are primitives that model—respectively—the Wait( )\Notify( ) and Wait( )\NotifyAll( ) constructs of Java. Pairwise Rendezvous primitives are inspired by CCS process algebra.

For our purposes herein, we consider the important paradigm of PDSs communicating via nested locks. Most real-world concurrent programs use locks in a nested fashion, viz., each thread can only release the lock that it acquired last and that has not yet been released. Indicative of its practical importance, contemporary programming guidelines used by software developers often require that locks be used in a nested fashion. In fact, in Java (version 1.4) and C# locking is syntactically guaranteed to be nested.

As is common when model checking concurrent systems, we consider correctness properties expressed as multi-index temporal logic formula where in a k-index formula, the atomic propositions are interpreted over the local control states of k PDSs. Advantageously, it turns out that most interesting properties about concurrent programs can be expressed as single or double-index properties.

Those skilled in the art already are aware that the model checking problem is efficiently decidable for single-index LTL properties for Dual-PDS systems interacting via nested locks. However, a number of interesting properties about concurrent programs, like data races, can only be expressed as double-indexed properties. Consequently, we therefore consider double-indexed LTL properties. Furthermore, most of the work on the model checking of concurrent programs has focused on safety and linear-time properties with little work addressing the more complex branching-time properties. Hence from the branching-time spectrum, we consider Alternation-free Mu-Calculus properties.

It turns out that unlike single-index LTL properties, the decidability scenario for double-indexed LTL properties is more interesting. While the model checking problem for single-index LTL properties is efficiently decidable, it is, in general, not decidable for the full-blown double-index LTL, but only for certain fragments. Undecidability of a sub-logic of double-indexed LTL hinges on whether it is expressive enough to encode the disjointness of the context-free languages accepted by the PDSs in the given Multi-PDS system as a model checking problem. This, in turn, depends on the temporal operators allowed by the logic thereby providing a natural way to characterize fragments of double-indexed LTL for which the model checking problem is decidable.

We use $L(Op_1, \ldots, Op_k)$, where $Op_i \in \{X, F, U, G, \overset{\infty}{F}\}$, to denote the fragment comprised of formulae of the form Ef, where f is double-indexed LTL formula in positive normal form (PNF), viz., only atomic propositions are negated, built using the operators $Op_1, \ldots, Op_k$ and the Boolean connectives $\vee$ and $\wedge$. Here X "next-time", F "sometimes", U, "until", G "always", and $\overset{\infty}{F}$ "infinitely-often" denote the standard temporal operators and E is the "existential path quantifier". Obviously, L(X,U,G) is the full-blown double-indexed LTL.

For the purposes of the present invention, we not only formulate efficient procedures for fragments of double-indexed LTL for which the model checking for Dual-PDS system is decidable but also delineate precisely the decidability/undecidability boundary for each of the standard synchronization primitives. Specifically, we show the following.

The model checking problems for L(F,G) and L(U), viz., formulae in PNF allowing (i) only the "until" U temporal operator, or (ii) only the "always" G and the "eventual" F temporal operators are, in general, undecidable even for Dual-PDS systems wherein the PDSs do not interact at all with each other. The above results imply that in order to get decidability for Dual-PDS systems, interacting or not, we have to restrict ourselves to either the sub-logic $L(X, F, \overset{\infty}{F})$ or the sub-logic L(G,X). For these sub-logics, the decidability of model checking depends on the synchronization primitive used by the PDSs.

For PDSs interacting via pairwise rendezvous we get the surprising result that model checking problem is decidable for the sub-logic L(X,G). In fact, we show that the decidability result extends to PDS interacting via asynchronous rendezvous and broadcasts. Regarding the other fragment, viz., $L(X, F, \overset{\infty}{F})$, it is already known that the model checking problem is undecidable for both the sub-logics L(F) and $L(\overset{\infty}{F})$ (and hence for $L(X, F, \overset{\infty}{F})$) for PDSs interacting using either non-nested locks or pairwise rendezvous. The undecidability result for broadcasts and asynchronous rendezvous, both of which are more expressive than pairwise rendezvous, then follows. This settles the model checking problem for all the standard synchronization primitives.

Finally, for the practically important paradigm of PDSs interacting via nested locks, we show that the model checking problem is efficiently decidable for both the sub-logics $L(X, F, \overset{\infty}{F})$ and L(X,G).

The fact that the undecidability results hold even for systems with non-interacting PDSs may seem surprising at first. However, we note that allowing doubly-indexed properties (wherein atomic propositions are interpreted over pairs of control states of the PDSs comprising the given Dual-PDS system) allows us to explore precisely that portion of the state space of the given Dual-PDS system where the PDSs are coupled tightly enough to accept the intersection of the context-free languages accepted by them, thereby yielding undecidability. This is one reason why the model checking problem for single-indexed LTL properties is robustly decidable for PDSs interacting via nested locks, while for doubly indexed properties it is decidable only for very restricted fragments that do not allow this strong coupling.

The procedure for single-index LTL properties for PDSs synchronizing via nested locks involves reducing the model checking problem to the computation of pre*-closures of regular sets of configurations of the given Dual-PDS system. For single-index properties, this was accomplished via a Dual Pumping Lemma, which, unfortunately, does not hold for the double-indexed case. In fact, the undecidability of the model checking problem for doubly indexed formulae shows that such a reduction cannot exist in general. Thus model checking double-indexed LTL properties requires a different approach.

To get a model checking procedure for $L(X,F,\overset{\infty}{F})$, given an automaton $R_f$ accepting the set of configurations satisfying a formula f of $L(X,F,\overset{\infty}{F})$, we first formulate efficient procedures for computing an automaton $R_{Opf}$ accepting the set of all configurations that satisfy Opf, where $Op \in \{X,F,\overset{\infty}{F}\}$ is a temporal operator that can be used in a formula of $L(X,F,\overset{\infty}{F})$. Recursively applying these procedures starting from the atomic propositions and proceeding 'outwards' in the given formula f then gives us the desired model checking algorithm.

A natural question that arises is that if $L(X,F,\overset{\infty}{F})$ model checking is decidable then why not full-blown double-indexed LTL model checking by reduction to this problem via the automata-theoretic paradigm. One key obstacle to decidability of the model checking problem for systems comprising two PDSs is the problem of deciding the disjointness of the context-free languages accepted by the PDSs. If the PDSs can be coupled together tightly enough to accept the intersection of the context free languages accepted by the PDSs, the model checking problem is undecidable. This tight coupling can be achieved either by making the synchronization primitive strong enough, e.g., broadcasts, or the property being model checked expressive enough, e.g., L(U). In fact, it turns out that in order to ensure decidability of the model checking problem for Dual-PDS systems, we have to restrict ourselves to properties that encode "simple" reachability or those for which the model checking problem can be reduced to such properties.

Guided by the above observations, for model checking L(X,G) we reduce the problem to a set of simple reachability problems. Towards that end, given a formula f of L(X,G), we consider the equivalent problem of model checking for g=¬f. Then the positive normal form of g is a formula built using the temporal operators AX and AF, where A is the "universal path quantifier". Since AF is a 'simple reachability' property the problem is decidable, even though constructing an automaton accepting $R_{AFf}$ from the automaton $R_f$ is more complicated due to the branching nature of the property.

For the branching-time spectrum, we consider the model checking problem for Alternation-free Mu-Calculus formulae. For lack of space, we focus only on single-index properties. For such properties, we first show that the model checking problem for PDSs communicating via nested locks is efficiently decidable. Given a Multi-PDS system DP comprised of the PDSs $P_1, \ldots, P_n$, and a formula $\phi = \wedge \phi_i$, where $\phi_i$ is an alternation-fee Mu Calculus formula interpreted over the control states of $P_i$, we start by constructing the product $P_i$ of $P_i$ and $A_{\phi i}$, the Alternating Automaton for $\phi_i$. Each such product $P_i$ is represented as an Alternating Pushdown System (APDS) which incorporates the branching structure of the original PDS $P_i$. For model checking the Multi-PDS program DP for $\phi$, we need to compute the pre*-closure of regular sets of global configurations of the system comprised of all the APDSs $P_1, \ldots, P_n$. The main complexity here lies in the fact that we have to reason about lock interactions along all paths of tree-like models of APDSs $P_1, \ldots, P_n$ each having potentially infinitely many states.

This complexity is overcome by our contribution showing how to decompose the computation of the pre*-closure of a regular set of configurations of a Dual-PDS system DP synchronizing via nested locks to that of its constituent PDSs. This decomposition allows us to avoid the state explosion problem. To achieve the decomposition, we leverage the new concept of Lock-Constrained Alternating Multi-Automata Pairs (LAMAPS) which is used to capture regular sets of configurations of a given Multi-PDS system with nested locks. An LAMAP A accepting a regular set of configurations C of a Dual-PDS system DP comprised of PDSs $P_1$ and $P_2$ is a pair $A=(A_1,A_2)$, where $A_i$ is an Alternating Multi-Automata (AMA) (see [?]) accepting the regular set of local configurations of APDS $P_i$ corresponding to thread $P_i$ occurring in the global configurations of DP in C.

The lock interaction among threads is encoded in the acceptance criterion for an LAMAP which filters out those pairs of local configurations of $P_1$ and $P_2$ which are not simultaneously reachable due to lock interaction. Indeed, for a pair of tree-like models $w_1$ and $w_2$ for $\phi_1$ and $\phi_2$ in the individual APDS $P_1$ and $P_2$, respectively, to act as a witness for $\phi=\phi_1 \wedge \phi_2$ in the Dual-PDS system DP, they need to be reconcilable with respect to each other. Reconcilability means that for each path x in $w_1$ there must exist a path y in $w_2$ such that the local computations of $P_1$ and $P_2$ corresponding to x and y, respectively, can be executed in an interleaved fashion in DP, and vice versa. For two individual paths x and y reconcilability can be decided by tracking patterns of lock acquisition along x and y.

To check reconcilability of the trees $w_1$ and $w_2$, however, we need to track lock acquisition patterns along all paths of $w_i$ in APDS $P_i$. A key difficulty here is that since the depth of the tree $w_i$, could be unbounded, the number of local paths of $P_i$ in $w_i$ could be unbounded forcing us to potentially track an unbounded number of acquisition lock acquisition patterns. However, the crucial observation is that since the number of locks in the Dual-PDS system DP is fixed, so is the number of all possible acquisition patterns. An important consequence is that instead of storing the lock acquisition patterns for each path of tree $w_i$, we need only store the different patterns encountered along all paths of the tree. This ensures that the set of patterns that need be tracked is finite and bounded which can therefore be carried out as part of the control state of PDS $P_i$.

Decomposition is then achieved by showing that given an LAMAP $A=(A_1,A_2)$, if $B_i$ is an AMA accepting the pre*-closure of the configurations of the individual thread $P_i$ accepted by $A_i$, then, the LAMAP $B=(B_1,B_2)$ accepts the pre*-closure of the regular set of configurations of the Dual-PDS system DP accepted by A. Thus, broadly speaking, the decomposition results from maintaining the local configurations of the constituent PDSs separately as AMAs and computing the pre*-closures on these AMAs individually for each PDS for which existing efficient techniques can be leveraged. This yields decidability for PDSs interacting via nested locks. For PDSs communicating via rendezvous and broadcasts, we show the decidability does not hold for the full-blown single-indexed Alternation-free Mu-Calculus but only for certain fragments.

According to the present invention, we consider multi-threaded programs wherein threads synchronize using the standard primitives—locks, pairwise rendezvous, asynchronous rendezvous and broadcasts. Each thread is modeled as a Pushdown System (PDS).

As is known, a PDS has a finite control part corresponding to the valuation of the variables of the thread it represents and a stack which models recursion. Formally, a PDS is a five-tuple $P=(Q,Act,\Gamma,c_0,\Delta)$, where Q is a finite set of control locations, Act is a finite set of actions, $\Gamma$ is a finite stack alphabet, and $\Delta \subseteq (Q \times \Gamma) \times Act \times (Q \times \Gamma^*)$ is a finite set of transition rules.

If $((p,\gamma),a,(p',w)) \in \Delta$ then we write $$p,\gamma \xrightarrow{a} p',w.$$

A configuration of P is a pair $\langle p,w \rangle$, where $p \in Q$ denotes the control location and $w \in \Gamma^*$ the stack content. We call $c_0$ the initial configuration of P. The set of all configurations of P is denoted by C. For each action a, we define a relation $$\xrightarrow{a} \subseteq C \times C$$

as follows: if $$(q,\gamma) \xrightarrow{a} (q',w),$$

then $$(q,\gamma v) \xrightarrow{a} (q',wv)$$

for every $v \in \Gamma^*$.

Let DP be a multi-PDS system comprised of the PDSs $P_1, \ldots, P_n$, where $P_i=(Q_i,Act_i,\Gamma_i,c_i,\Delta_i)$. In addition to $Act_i$, we assume that each $P_i$ has special actions symbols labeling transitions implementing synchronization primitives. These synchronizing action symbols are shared commonly across all PDSs. In this paper, we consider the following standard primitives:

Locks: Locks are used to enforce mutual exclusion. Transitions acquiring and releasing lock l are labeled with acquire(l) and release(l), respectively.

Rendezvous (Wait-Notify): We consider two notions of rendezvous: CCS-style Pairwise Rendezvous and the more expressive Asynchronous Rendezvous motivated by the wait( ) and Notify( ) primitives of Java. Pairwise send and receive rendezvous are labeled with a! and a?, respectively. If $$c_{11} \xrightarrow{a!} c_{12}$$

and $$c_{21} \xrightarrow{a?} c_{22}$$

are pairwise send and receive transitions of $P_1$ and $P_2$, respectively, then for the rendezvous to be enabled both $P_1$ and $P_2$ have to simultaneously be in local control states $c_{11}$ and $c_{21}$. In that case both the send and receive transitions are fired synchronously in one execution step. If $P_1$ is in $c_{11}$ but $P_2$ is not in $c_{12}$ then $P_1$ cannot execute the send transition, and vice versa. Asynchronous Rendezvous send and receive transitions, on the other hand, are labeled with a–0.04 in↑ and a–0.04 in↓, respectively. The difference between pairwise rendezvous and asynchronous rendezvous, is that while in the former case the send transition is blocking, in the latter it is non-blocking. Thus a transition of the form $$c_{11} \xrightarrow{a\uparrow} c_{12}$$

can be executed irrespective of whether a matching receive transition of the form $$c_{21} \xrightarrow{a\downarrow} c_{22}$$

is currently enabled or not. On the other hand, the execution of a receive transition requires a matching send transition to be enabled with both the sender and receiver then being executed synchronously.

Broadcasts (Notify-All): Broadcast send and receive rendezvous, motivated by the wait( ) and NotifyAll( ) primitives of Java, are labeled with a!! and a??, respectively. If $$b_{11} \xrightarrow{a!!} b_{12}$$

is a broadcast send transition and $$b_{21} \xrightarrow{a??} b_{22}, \ldots, b_{n1} \xrightarrow{a??} b_{n2}$$

are the matching broadcast receives, then the receive transitions block pending the enabling of the send transition. The send transitions, on the other hand, is non-blocking and can always be executed and its execution is carried out synchronously with all the currently enabled receive transitions labeled with a??.

A concurrent program with n PDSs and m locks $l_1, \ldots, l_m$ is formally defined as a tuple of the form $DP=(P_1, \ldots, P_n, L_1, \ldots, L_m)$, where for each i, $P_i=(Q_i, Act_i, \Gamma_i, c_i, \Delta_i)$ is a pushdown system (thread), and for each j, $L_j \supseteq \{\bot, P_1, \ldots, P_n\}$ is the possible set of values that lock $l_j$ can be assigned. A global configuration of DP is a tuple $c=(t_1, \ldots, t_n, l_1, \ldots, l_m)$ where $t_1, \ldots, t_n$ are, respectively, the configurations of PDSs $P_1, \ldots, P_n$ and $l_1, \ldots, l_m$ the values of the locks. If no thread holds lock $l_i$ in configuration c, then $l_i = \bot$, else $l_i$ is the thread currently holding it. The initial global configuration of DP is $(c_1, \ldots, c_n, \bot, \ldots, \bot)$, where $c_i$ is the initial configuration of PDS $P_i$. Thus all locks are free to start with. We extend the relation $$x \xrightarrow{a}$$

to global global configurations of DP in the usual way.

The reachability relation $\xrightarrow{}$ is the reflexive and transitive closure of the successor relation $\rightarrow$ defined above. A sequence $x = x_0, x_1, \ldots$ of global configurations of DP is a computation if $x_0$ is the initial global configuration of DP and for each i, $$x_i \xrightarrow{a} x_{i+1},$$

where either for some j, $a \in Act_j$, or for some k, $a=release(l_k)$ or $a=acquire(l_k)$ or pairwise rendezvous send a=b! or receive a=b?, or asynchronous rendezvous send a=b–0.04 in↑ or receive a=b–0.04 in↓, or broadcast send a=b!! or receive a=b??. Given a thread $T_i$ and a reachable global configuration $c=(c_1, \ldots, c_n, l_1, \ldots, l_m)$ of DP, we use Lock-Set($T_i$,c) to denote the set of locks held by $T_i$ in c, viz., the set $\{l_j | l_j = T_i\}$. Also, given a thread $T_i$ and a reachable global configuration $c=(c_1, \ldots, c_n, l_1, \ldots, l_m)$ of DP, the projection of c onto $T_i$, denoted by $c \downarrow T_i$, is defined to be the configuration $(c_i, l'_1, \ldots, l'_m)$ of the concurrent program comprised solely of the thread $T_i$, where $l'_i = T_i$ if $l_j = T_i$ and $\bot$, otherwise (locks not held by $T_i$ are freed).

Multi-Automata Let $P=(P, Act, \Gamma, c_0, \Delta)$ be a pushdown system where $P=\{p_1, \ldots, p_m\}$. A P-multi-automaton (P-MA for short) is a tuple $A=(\Gamma, Q, \delta, I, F)$ where Q is a finite set of states, $\delta \subseteq Q \times \Gamma \times Q$ is a set of transitions, $I=\{s_1, \ldots, s_m\} \subseteq Q$ is a set of initial states and $F \subseteq Q$ is a set of final states. Each initial state $s_i$ corresponds to the control state $p_i$ of P.

We define the transition relation $\rightarrow \subseteq Q \times \Gamma^* \times Q$ as the smallest relation satisfying the following:

if $(q, \gamma, q') \in \delta$ then $q \xrightarrow{\gamma} q'$, $q \xrightarrow{\epsilon} q$ for every $q \in Q$, and if $q \xrightarrow{w} q''$ and $q'' \xrightarrow{\gamma} q'$ then $q \xrightarrow{w\gamma} q'$.

A Multi-Automaton can be thought of as a data structure that is used to succinctly represent (potentially infinite) regular sets of configurations of a given PDS. Towards that end, we say that Multi-Automaton A accepts a configuration ◆$p_i$,w◆ if $$s_i \xrightarrow{w} q$$

for some $q \in F$. The set of configurations recognized by A is denoted by Conf(A). A set of configurations is regular if it is recognized by some MA.

Relative Expressive Power of Synchronization Primitives. In proving the decidability results, we will exploit the following expressiveness relations: Pairwise Rendezvous<Asynchronous Rendezvous<Broadcasts, where < stands for the relation can be simulated by.

Nested Lock Access. Additionally, we also consider the practically important case of PDSs with nested access to locks. Indeed, standard programming practice guidelines typically recommend that programs use locks in a nested fashion. In fact, in languages like Java (version 1.4) and C# locks are guaranteed to be nested. We say that a concurrent program accesses locks in a nested fashion if along each computation of the program a thread can only release the last lock that it acquired along that computation and that has not yet been released.

As an example and with reference now to FIG. 1, there is shown a program excerpt having a number of threads. As can be seen in that figure, the thread comprised of procedures nested and bar accesses locks a, b, and c in a nested fashion whereas the thread comprised of procedures non_nested and bar does not. This is because calling bar from non_nested releases lock b before lock a even though lock a was the last one to be acquired.

Correctness Properties. The problem of model checking Dual-PDS systems for the full-blown single-index LTL has been shown to be efficiently decidable. For our purposes herein, we consider double-indexed Linear Temporal Logic (LTL) formulae. Here atomic propositions are interpreted over pairs of control states of different PDSs in the given multi-PDS system. Note that our properties do not take the stack contents of PDSs into account. This is because in dataflow analysis, the dataflow facts being tracked are usually modified only by the program statements at individual control locations independent of how the control location was reached. The stack is merely used to track the context, viz., the order in which function are called in reaching the current control location.

Conventionally, $DP \models f$ for a given LTL formula f if and only if f is satisfied along all paths starting at the initial state of DP. Using path quantifiers, we may write this as $DP \models Af$. Equivalently, we can model check for the dual property $\neg = \neg \models Eg$. Furthermore, we can assume that g is in positive normal form (PNF), viz., the negations are pushed inwards as far as possible using DeMorgan's Laws: $\neg(p \lor q) = \neg p \land \neg q$, $\neg(p \lor q) = \neg p \land \neg q$, $\neg Fp \equiv Gq$, $\neg(pUq) \equiv G\neg q \lor \neg qU(\neg p \lor \neg q)$.

For Dual-PDS systems, it turns out that the model checking problem is not decidable for the full-blown double-indexed LTL but only for certain fragments. Decidability hinges on the set of temporal operators that are allowed in the given property which, in turn, provides a natural way to characterize such fragments. We use $L(Op_1, \ldots, Op_k)$, where $Op_i \in \{X, F, U, G, \overset{\infty}{F}\}$, to denote the fragment of double-indexed LTL comprised of formulae in positive normal form (where only atomic propositions are negated) built using the operators $Op_1, \ldots, Op_k$ and the Boolean connectives $\lor$ and $\land$. Here X "next-time", F "sometimes", U, "until", G "always", and $\overset{\infty}{F}$ "infinitely-often" denote the standard temporal operators (see [?]). Obviously, L(X,U,G) is the full-blown double-indexed LTL.

The core of our decision procedure revolves around manipulating regular sets of configurations of the given Dual-PDS system DP. A natural way to represent regular sets of configurations of a Dual-PDS system with PDSs interacting via nested locks is by using the concept of Lock-Constrained Multi-Automata Pairs (LMAP) which we will briefly review next. Alternately, pairs of summaries can also be used to represent pairs of reachable configurations. Here, we describe the use of LMAPs.

LMAPs allow us to not only succinctly represent potentially infinite sets of regular configurations of DP but, in addition, enable us to decompose pre*-closure computations of regular sets of a Dual-PDS system DP to its individual PDSs thereby avoiding the state explosion problem. This is accomplished via a Decomposition Result that generalizes both the Forward and Backward Decomposition results as presented in. Essentially, the Decomposition Result enables us to reduce the problem of deciding the reachability of one global configuration of DP from another to reachability problems for local configurations of the individual PDSs.

Lock-Constrained Multi-Automata. The main motivation behind defining a Lock-Constrained Multi-Automaton (LMAP) is to decompose the representation of a regular set of configurations of a Dual-PDS system DP comprised of PDSs $P_1$ and $P_2$ into a pair of regular sets of configurations of the individual PDSs $P_1$ and $P_2$. An LMAP accepting a regular set R of configurations of DP is a pair of Multi-Automata $M=(M_1,M_2)$, where $M_i$ is a multi-automaton accepting the regular set of local configurations $R_i$ of $P_i$ in R. A key advantage of this decomposition is that performing operations on M, for instance computing the pre*-closure of R reduces to performing the same operations on the individual MAs $M_i$. This avoids the state explosion problem thereby making our procedure efficient. The lock interaction among the PDSs is captured in the acceptance criterion for the LMAP via the concept of Backward and Forward Acquisition Histories which we briefly recall next, followed by a formulation of the Decomposition Result.

Consider a concurrent program DP comprised of the two threads shown in FIG. 2(A) and FIG. 2(B), respectively. Suppose that we are interested in deciding whether a pair of control locations of the two threads are simultaneously reachable. We show that reasoning about reachability for the concurrent program, can be reduced to reasoning about reachability for the individual threads.

Observe that $DP \models EF(4a \wedge 4b)$ but $DP \not\models EF(4a \wedge 7b)$ even though disjoint sets of locks, viz., $\{p\}$ and $\{q\}$, are held at a and b, respectively. The key point is that the simultaneous reachability of two control locations of $P_1$ and $P_2$ depends not merely on the locksets held at these locations but also on patterns of lock acquisition along the computation paths of DP leading to these control locations. These patterns are captured using the notions of backward and forward acquisition histories.

Indeed, if $P_1$ executes first it acquires p and does not release it along any path leading to a. This prevents $P_2$ from acquiring p which it requires in order to transit from b to b. Similarly if $P_2$ executes first, it acquires q thereby preventing $P_1$ from transiting from a to a which requires it to acquire and release lock q. This creates an unresolvable cyclic dependency. These dependencies can be formally captured using the notions of backward and forward acquisition histories.

Definition (Forward Acquisition History) For a lock l held by $P_i$ at a control location $d_i$, the forward acquisition history of l along a local computation $x_i$ of $P_i$ leading from $c_i$ to $d_i$, denoted by $fah(P_i,c_i,l,x_i)$, is the set of locks that have been acquired (and possibly released) by $P_i$ since the last acquisition of l by $P_i$ in traversing forward along $x_i$ from $c_i$ to $d_i$. In case l is not acquired but held in each state along $x_i$ then $fah(P_i,c_i,l,x_i)$, is simply the set of locks that have been acquired (and possibly released) by $P_i$ along $x_i$.

Observe that along any local computations $x_1$ and $x_2$ of $P_1$ and $P_2$ leading to control locations 4a and 7b, respectively, $fah(P_1,4a,p,x_1)=\{q\}$ and $fah(P_2,7b,q,x_2)=\{p,r\}$. Also, along any local computations $x'_1$ and $X'_2$ of $P_1$ and $P_2$ leading to control locations 4a and 4b, respectively, $fah(P_1,4a,p,x'_1)=\{q\}$ and $fah(P_2,4b,q,x'_2)=\{r\}$. The reason $EF(4a \wedge 7b)$ does not hold but $EF(4a \wedge 4b)$ does is because of the existence of the cyclic dependency that $p \in fah(P_2,7b,q,x_2)$ and $q \in fah(P_2,4a,p,x_1)$ whereas no such dependency exists for the second case.

Definition (Backward Acquisition History). For a lock l held by $P_i$ at a control location $c_i$, the backward acquisition history of l along a local computation $x_i$ of $P_i$ leading from $c_i$ to $d_i$, denoted by $bah(P_i,c_i,l,x_i)$, is the set of locks that were released (and possibly acquired) by $P_i$ since the last release of l by $P_i$ in traversing backwards along $x_i$ from $d_i$ to $c_i$. In case l is not released but held in each state along $x_i$ then $bah(P_i,c_i,l,x_i)$, is simply the set of locks that have been released (and possibly acquired) by $P_i$ along $x_i$.

The concepts of backward and forward acquisition histories have been used to decide whether given two global configurations c and d of DP, whether d is reachable from c. The notion of forward acquisition history was used in the case where no locks are held in c and that of backward acquisition history in the case where no locks are held in d. In other words, we want to decide whether c is backward reachable from d. First, we assume that all locks are free in d. In that case, we track the bah of each lock. In our example, lock l, initially held at c, is first released at $c_2$. Then all locks released before the first release of l belongs to the bah of l. Thus, $l_1$ belongs to the bah of l but $l_3$ does not. On other hand, if in c all locks are free, then we track the fah of each lock. If a lock l held at d is last acquired at $c_3$ then all locks acquired since the last acquisition of l belong to the fah of l. Thus in our example, $l_2$ belongs to the forward acquisition history of l but $l_4$ does not.

When testing for backward reachability of c from d in DP, it suffices to test whether there exist local paths x and y of the individual PDSs from states $c_1=c \downarrow P_1$ to $d_1=d \downarrow P_1$ and from $c_2=c \downarrow P_2$ to $d_2=d \downarrow P_2$, respectively, such that along x and y locks operations can be executed in a acquisition history compatible fashion as formulated in the Decomposition Result below.

Theorem 1 (Decomposition Result). Let DP be a Dual-PDS system comprised of the two PDSs $P_1$ and $P_2$ with nested locks. Then configuration c of DP is backward reachable from configuration d iff configurations $c_1=c \downarrow P_1$ of $P_1$ and $c_2=C \downarrow P_2$ of $P_2$ are backward reachable from configurations $d_1=d \downarrow P_1$ and $d_2=d \downarrow P_2$, respectively, via local computation paths x and y of PDSs $P_1$ and $P_2$, respectively, such that
1. Lock-Set$(P_1,c_1) \cap$ Lock-Set$(P_2,c_2)=\emptyset$
2. Lock-Set$(P_1,d_1) \cap$ Lock-Set$(P_2,d_2)=\emptyset$
3. Locks-Acq(x)$\cap$Locks-Held(y)$=\emptyset$ and Locks-Acq(y)$\cap$Locks-Held(x)$=\emptyset$, where for path z, Locks-Acq(z) is the set of locks that are acquired (and possibly released) along z and Locks-Held(z) is the set of locks that are held in all states along z.

4. there do not exist locks $l \in Lock\text{-}Set(P_1,c_1) \backslash Locks\text{-}Held(x)$ and $l' \in Lock\text{-}Set(P_2,c_2) \backslash Locks\text{-}Held(y)$ such that $l \in bah(P_2, c_2, l', y)$ and $l' \in bah(P_1, c_1, l, x)$.

5. there do not exist locks $l \in Lock\text{-}Set(P_1,d_1) \backslash Locks\text{-}Held(x)$ and $l' \in Lock\text{-}Set(P_2,d_2) \backslash Locks\text{-}Held(y)$ such that $l \in fah(P_2,c_2,l',y)$ and $l' \in fah(P_1, c_1, l, x)$.

Intuitively, conditions 1 and 2 ensure that the locks held by $P_1$ and $P_2$ in a global configuration of DP must be disjoint; condition 3 ensures that if a lock held by a PDS, say $P_1$, is not released along the entire local computation x, then it cannot be acquired by the other PDS $P_2$ all along its local computation y, and vice versa; and conditions 4 and 5 ensure compatibility of the acquisition histories, viz., the absence of cyclic dependencies as discussed above.

We may now demonstrate that the Decomposition Result allows us to reduce the pre*-closure computation of a regular set of configurations of a Dual-PDS system to that of its individual acquisition history augmented PDSs. Towards that end, we first need to extend existing pre*-closure computation procedures for regular sets of configurations of a single PDS to handle regular sets of acquisition history augmented (ah-augmented) configurations. An acquisition history augmented configurations $c_i$ of $P_i$ is of the form $\langle p_i, w \rangle l_1, \ldots, l_m, bah_1, \ldots, bah_m, fah_1, \ldots, fah_m \rangle$ where for each i, $fah_i$ and $bah_i$ are lock sets storing, respectively, the forward and backward acquisition history of lock $l_i$. Since the procedure is similar to the ones for fah and bah-augmented configurations its formal description is omitted. The key result is the following:

Theorem 2 (ah-enhanced pre*-computation). Given a PDS P, and a regular set of ah-augmented configurations accepted by a multi-automaton A, we can construct a multi-automaton $A_{pre*}$ recognizing pre*(Conf(A)) in time polynomial in the sizes of A and the control states of P and exponential in the number of locks of P.

Acceptance Criterion for LMAPs. The absence of cyclic dependencies encoded using bah s and fah s are used in the acceptance criterion for LMAPs to factor in lock interaction among the PDSs that prevents them from simultaneously reaching certain pairs of local configurations. Motivated by the Decomposition Theorem, we say that augmented configurations $c_1 = \langle c,w \rangle, l_1, \ldots, l_m, bah_1, \ldots, bah_m, fah_1, \ldots, fah_m \rangle$ and $c_2 = \langle c',w' \rangle, l'_1, \ldots, l'_m, bah_1, \ldots, bah_m, fah_1, \ldots, fah_m \rangle$ of $P_1$ and $P_2$, respectively, are fah-compatible iff there do not exist locks $l_i$ and $l_j$ such that $l_i = P_1$, $l'_j = P_2$, $l_i \in fah_j$ and $l_j \in fah_i$. Analogously, we say that $c_1$ and $c_2$ are bah-compatible iff there do not exist locks $l_i$ and $l_j$ such that $l_i = P_1$, $l'_j = P_2$, $l_i \in bah_j$ and $l_j \in bah_i$.

Definition 3 (LMAP Acceptance Criterion). Let $A=(A_1, A_2)$ be an LMAP, where $A_i$ is a multi-automaton accepting ah-augmented configurations of $P_i$. We say that A accepts global configuration $\langle p_i,w \rangle, \langle q_j,v \rangle, l_1, \ldots, l_m \rangle$ of DP iff there exist there exist augmented local configurations $c_1 = \langle p_i,w \rangle, l'_1, \ldots, l'_m, bah_1, \ldots, bah_m, fah_1, \ldots, fah_m \rangle$ and $c_2 = \langle q_j,v \rangle, l''_1, \ldots, l''_m, bah_1, \ldots, bah_m, fah_1, \ldots, fah_m \rangle$, where $l'_i = P_1$ if $l_i = P_1$ and $\perp$ otherwise and $l''_i = P_2$ if $l_i = P_2$ and $\perp$ otherwise, such that
1. $A_i$ accepts $c_i$, and
2. $Lock\text{-}Set(P_1,c_1) \cap Lock\text{-}Set(P_2,c_2) = \emptyset$, and
3. $c_1$ and $c_2$ are bah-compatible and fah-compatible.

Given an LMAP $A=(A_1,A_2)$, we use Conf(A) to denote the set of configurations of DP accepted by A. Let LMAP $B=(B_1, B_2)$, where $B_i$ is the MA accepting pre*(Conf($A_i$)) constructed from $A_i$ using an ah-augmented pre*-closure computation procedure similar to the one for bah and fah-augmented configurations given in [?]. Then corollary 4 follows easily from the Decomposition Result which when combined with theorem 2 leads to the efficient pre*-closure computation result formulated in theorem 5 below.

Corollary 4 (pre*-closure Decomposition). pre*(Conf(A))=Conf(B).

Theorem 5 (pre*-closure Computation). Let A be an LMAP. Then we can construct an LMAP accepting pre*(Conf(A)) in polynomial time in the size of DP and exponential time in the number of locks of DP.

Nested Locks: The Model Checking Procedure for $L(X,F,\overset{\infty}{F})$

We start by presenting the decision procedures for model checking $L(X,F,\overset{\infty}{F})$ and $L(X,G)$ for PDSs interacting via nested locks. The model checking problem for single-indexed LTL\X formulae interpreted over finite paths and over infinite paths is know to those skilled in the art. In particular, the procedures for single-index properties involves reducing the model checking problem to the computation of pre*-closures of regular sets of configurations of the given Dual-PDS system. For single-index properties, this is accomplished via a Dual Pumping Lemma, which, unfortunately, does not hold for the double-indexed case. Therefore, as noted earlier, model checking multi-indexed formulae requires a different approach.

Given an LMAP $R_f$ accepting the set of configurations satisfying a formula f of $L(X,F,\overset{\infty}{F})$, we give for each temporal operator $Op \in \{X,F,\overset{\infty}{F}\}$, a procedure for computing an LMAP $R_{Opf}$ accepting the set of all configurations that satisfy Opf. Recursively applying these procedures starting from the atomic propositions and proceeding 'outwards' in the given formula f then gives us the desired model checking algorithm.

The construction of LMAP $R_{Opf}$ for the case where Op=F, was given in [?] as were the constructions for the boolean connectives $\wedge$ and $\vee$. We now show how to handle the cases where $Op \in \{\overset{\infty}{F},X\}$ starting with the case where $Op=\overset{\infty}{F}$. Given an LMAP $R_f$, constructing the $$LMAP\ R_{\overset{\infty}{F}f}$$

accepting the set of configurations of DP satisfying $\overset{\infty}{F}f$ is, in general, not possible. Indeed, that would make the model checking problem for the full-blown doubly-indexed LTL decidable, contrary to the undecidability results in section 7 which show that $$R_{\overset{\infty}{F}f}$$

can be constructed only for the case where f is a $L(X,F,\overset{\infty}{F})$ formula. However, even here the construction becomes intricate when f is an arbitrary $L(X,F,\overset{\infty}{F})$ formula. To simplify the procedure, we first show that given a formula f of $L(X,F,\overset{\infty}{F})$, we can drive down the $\overset{\infty}{F}$ operator so that it quantifies only over atomic propositions or negations thereof. Then it suffices to construct an LMAP $R_\infty \atop F f$ only for the case where f is a (doubly-indexed) atomic proposition or negation thereof which can be accomplished elegantly. Formally, we show the following.

Proposition 6 (Driving down the $\overset{\infty}{F}$ operator). For any formula f of L(X,F, $\overset{\infty}{F}$), we can construct a formula f' where the temporal operator $\overset{\infty}{F}$ quantifies only over atomic propositions or negations thereof such that DP ⊨ f iff DP ⊨ f'.

Constructing an LMAP for $\overset{\infty}{F} f$. Note that if f is an atomic proposition or negation thereof, $R_f$ accepts the set $\{c_1\} \times \Gamma_1^* \times \{c_2\} \times \Gamma_2^*$, where $(c_1,c_2) \in C_f \subseteq Q_1 \times Q_2$ is the finite set of pairs of control states of $P_1$ and $P_2$ satisfying f.

We start by proving an $\overset{\infty}{F}$-Reduction Result that allows us to reduce the construction of an LMAP accepting $$\begin{array}{c} R_\infty \\ F \end{array}$$

to multiple instances of pre*-closure computations for which theorem 5 can be leveraged. Let DP be a Dual-PDS system comprised of PDSs $P_1$ and $P_2$ and f an atomic proposition, or negation thereof, over the control states of $P_1$ and $P_2$. The key idea is to show that a configuration c∈

$$\begin{array}{c} R_\infty \\ F f \end{array}$$

iff there is a finite path leading to a pumpable cycle containing a configuration g satisfying f. For a finite state system, a pumpable cycle is a finite path starting and ending in the same state with g occurring along it. For a PDS which has infinitely many states due to the presence of an unbounded stack, the notion of pump-ability is different. We say that a PDS is pumpable along a finite path x if executing x returns the PDS to the same control location and the same symbol on top of its stack as it started with, without popping any symbol not at the top of the stack to start with. This allows us to execute the sequence of transitions along x back-to-back indefinitely.

In a Dual-PDS system, since we have two stacks, the pumping sequence of the individual PDSs can be staggered with respect to each other. More formally, let DP be a Dual-PDS system comprised of the PDSs $P_1=(Q_1,Act_1,\Gamma_1,c_1,\Delta_1)$ and $P_2=(Q_2,Act_2,\Gamma_2,c_2,\Delta_2)$ and f an atomic proposition or negation thereof. Then we can show the following.

Theorem 7 ($\overset{\infty}{F}$-Reduction Result) Dual-PDS system DP has a run satisfying $\overset{\infty}{F} f$ starting from an initial configuration c if and only if there exist a∈$\Gamma_1$,β∈$\Gamma_2$; u∈$\Gamma_1^*$,v∈$\Gamma_2^*$; a configuration g satisfying f; configurations $lf_1$ and $lf_2$ in which all lock are free; lock values $l_1, \ldots, l_m, l'_1, \ldots, l'_m$; control states p',p'''∈$P_1$, q',q''∈$P_2$; u',u'',u'''∈$\Gamma_1^*$; and v',v'',v'''∈$\Gamma_2^*$ satisfying the following conditions −0.1 in 1. c ⟶ (⟨p, αu⟩, ⟨q',v'⟩,$l_1, \ldots, l_m$)
2. (⟨p,α⟩, ⟨q',v'⟩,$l_1,\ldots,l_m$) ⟶ (⟨p'p',u'⟩, ⟨q,βv⟩,$l'_1,\ldots,l'_m$)
3. (⟨p',u'⟩, ⟨q,β⟩,$l'_1, \ldots, l'_m$)

⟶ $lf_1$ ⟶ g ⟶ $lf_2$
⟶ (⟨p,αu''⟩, ⟨q'',v''⟩,$l_1, \ldots, l_m$)
⟶ (⟨p''',u'''⟩, ⟨q,βv'''⟩$l'_1, \ldots, l'_m$)

Intuitively, PDS $P_1$ is pumped by executing the stem, viz., the sequence c ⟶ (⟨p,αu⟩, ⟨q',v'⟩$l_1, \ldots, l_m$) followed by repeatedly executing the pumpable control cycle, viz., the sequence (⟨p',u'⟩,⟨q,β⟩,$l'_1, \ldots, l'_m$) ⟶ g ⟶ (⟨p,αu''⟩,⟨q'',v''⟩,$l_1,\ldots,l_m$) back-to-back. Analogously, PDS $P_2$ is pumped by repeatedly executing the pumpable control cycle (⟨p',u'⟩,⟨q,β⟩, $\ldots$ , $l'_m$) ⟶ g ⟶ (⟶ p,αu''⟩,⟨q'',v''⟩,$l_1,\ldots,l_m$) ⟶ (⟨p'''u'''⟩, ⟨q,βv'''⟩,$l'_1,\ldots,l'_m$) back-to-back. Finally, the sequence (⟨p,αu⟩,⟨q',v'⟩,$l_1, \ldots, l_m$) ⟶ (⟨p', u'⟩,⟨q,βv⟩,$l'_1, \ldots, l'_m$) represents the stagger between the pumping sequences of the two PDSs.

Why the Reduction to pre*-closure Computations does not work in general. A question that arises is why can we not reduce the model checking problem for an arbitrary double-indexed LTL formula f to the computation of pre*-closures as above. Indeed, using the automata theoretic approach to model checking, one can first construct the product BP of DP and the Büchi Automaton for f. Then model checking for f simply reduces to checking whether there exists a path along which a final state of BP occurs infinitely often, viz, g=$\overset{\infty}{F}$green holds, where green is an atomic proposition characterizing the set of final states of BP. Note that g is a formula of L(X,F, $\overset{\infty}{F}$). It turns out that for the general case, the ⟵ direction of the above result holds but not the ⟶ direction. Indeed, in order for ⟶to hold, we have to decide whether we can construct an accepting sequence of BP by appropriately scheduling the local transitions of PDSs $P_1$ and $P_2$ occurring along the finite sequences satisfying conditions 1, 2, and 3 of the $\overset{\infty}{F}$-Reduction result. However, the key point is that this scheduling must respect the constraints imposed by the Büchi Automaton for f. All that the Decomposition result allows us to decide is whether a global configuration c is reachable from another global configuration d of DP, viz., whether a scheduling of the local transitions exists that enables DP to reach d from c. However it does not guarantee that this scheduling will not violate the Büchi constraints for f. Indeed, as was discussed in the introduction, it is, in general, undecidable whether a scheduling satisfying given Büchi constraints exists.

Reduction to the Computation of pre*-closures. The $\overset{\infty}{F}$-Reduction result allows us to reduce the computation of an LMAP accepting $\overset{\infty}{F} f$ to the computation of pre*-closures as given by the following encoding of the conditions of the above theorem.

Let $R_0$=pre*($\{p\} \times a\Gamma_1^* \times P_2 \times \Gamma_2^* \times \{(l_1,\ldots,l_m)\}$) Then condition 1 can be re-written as c∈$R_0$. Similarly, if $R_1=P_1 \times \Gamma_1^* \times \{q\} \times \beta \Gamma_2^* \times \{(l'_1, \ldots, l'_m)\}$ $R_2$=pre*($R_1$)∩$\{p\} \times \{a\} \times P_2 \times \Gamma_2^* \times \{(l_1, \ldots, l_m)\}$ then condition 2 can be captured as $R_2$∅. Finally, let $R_3=P_1 \times \Gamma_1^* \times \{q\} \times \beta \Gamma_2^* \times \{(l'_1, \ldots, l'_m)\}$ $R_4$=pre*($R_3$)∩$\{p\} \times a\Gamma_1^* \times P_2 \times \Gamma_2^* \times \{(l_1, \ldots, l_m)\}$$R_5$=pre*($R_4$)∩$P_1 \times \Gamma_1^* \times P_2 \times \Gamma_2^* \times \{(\perp, \ldots, \perp)\}$, $R_6$=pre*($R_5$)∩G×$L_1 \times \ldots \times L_m$, where G=$\cup_{(g_1,g_2)}(\{g_1\} \times \Gamma_1^* \times \{g_2\} \times \Gamma_2^*)$ with $(g_1,g_2)$ being a control state pair of DP satisfying f, $R_7$=pre*($R_6$)∩$P_1 \times \Gamma_1^* \times P_2 \times \Gamma_2^* \times \{(\perp, \ldots, \perp)\}$, $R_8$=pre*($R_7$)∩$P_1 \times \Gamma_1^* \times \{q\} \times \{\beta\} \times \{l'_1, \ldots, l'_m\}$.

Then condition 3 is equivalent to $R_8 \neq \emptyset$. Thus the LMAP $R_0 \cap R_2 \cap R_8$ accepts $\overset{\infty}{F} f$. Note that we need take the union of this LMAP for each possible value of the tuple $(a,\beta,l_1,\ldots,l_m)$. As a consequence of the above encoding and the fact that pre*-closures, unions and intersections of LMAPs can be computed efficiently (theorem 5), we have the following.

Theorem 8. Let DP be a Dual-PDS system synchronizing via nested locks and f a boolean combination of atomic propositions. Then given an LMAP $R_f$ accepting a regular set of configurations of DP, we can construct an $$LMAP\ R_{\overset{\omega}{F}f}$$

accepting the set of configurations satisfying $\overset{\omega}{F}f$ in polynomial time in the size control states of DP and exponential time in the number of locks.

Constructing an LMAP for Xf. Given an LMAP $R_f$ accepting the set of configurations satisfying f, the LMAP $R_{Xf}$, due to interleaving semantics, is the disjunction over i of the LMAPs $R_{Xf}$ where $R_{Xf}$ is the LMAP accepting the pre-image of Conf($R_f$) in PDS $P_i$. The construction of LMAP $R_{Xf}$ is the same as the one carried out in each step of the pre*-closure computation procedure for an individual ah-enhanced PDS.

This completes the construction of the LMAP $R_{Opf}$ for each of the operators Op $\in\{X,F,\overset{\omega}{F}\}$ leading to the following decidability result.

Theorem 9 (L(X,F,$\overset{\omega}{F}$)-decidability). The model checking problem for L(X,F,$\overset{\omega}{F}$) is decidable for PDSs interacting via nested lock in time polynomial in the sets of control states of the given Dual-PDS system and exponential time in the number of locks.

Nested Locks The Model Checking Procedure for L(X,G).

Let f be a formula of L(X,G). We formulate a decision procedure for the equivalent problem of model checking DP for ¬f. Since f is a formula of L(X,G), the positive normal form of its negation ¬f is a formula built using the operations AF,AX,∨,∧ and atomic propositions or negations thereof interpreted over the control states of the PDSs constituting the given Dual-PDS system. Given the formula g=¬f, we proceed as follows:

1. For each sub-formula p of g that is either an atomic proposition, or negation thereof, we construct an LMAP representing the set of regular configurations satisfying p.

2. Next, given an LMAP accepting the set of configurations satisfying a sub-formula h of g, we give procedures for computing LMAPs accepting the regular set of configurations satisfying AXh and AFh. Leveraging these procedures and the closure properties of LMAPs under ∧and ∨then gives us a procedure to construct an LMAP $M_{¬f}$ accepting the set of configurations satisfying ¬f.

3. In the final step, all we do is check whether the initial configuration of DP is accepted by $M_{¬f}$.

Computing the LMAP accepting AFg. We next present a novel way to represent regular sets of configurations of a Dual-PDS system that enables us to compute the regular set of configurations accepting AFg. To motivate our procedure, we recall the one for model checking EFg. Our over-arching goal there was to reduce global reasoning about a Dual-PDS system DP for EFg (and other linear-time temporal properties) to local reasoning about the individual PDSs. This was accomplished by using the machinery of acquisition histories.

Here, in order to test whether c ⊨EFg, viz., there is a global path of DP starting at c and leading to a configuration d satisfying g, it is sufficient to test, whether for each i, there exists a local path $x_i$ leading from $c_i$ to $d_i$, the local configurations of c and d in $P_i$, respectively, such that $x_1$ and $x_2$ are acquisition-history compatible. Towards that end, we augmented the local configuration of each individual PDS $P_i$ with acquisition history information with respect to path $x_i$ and represented regular sets of configurations of DP as a single LMAP M=($M_1$,$M_2$), where each $M_i$ accepts only those pair of augmented configurations of $P_1$ and $P_2$ that are acquisition history compatible. Then, the Decomposition Result allowed us to reduce the problem of deciding whether c ⊨EFg, to deciding, whether there existed ah-augmented configurations accepted by $M_1$ and $M_2$ with $P_1$ and $P_2$ in local configurations $c_1$ and $c_2$, respectively, that are acquisition history compatible.

When deciding whether c ⊨AFg, our goal remains the same, i.e., to reduce reasoning about the given Dual-PDS system to its individual constituent PDSs. In this case, however, we have to check whether all paths starting at c lead to a configuration satisfying g. The set of all such paths is now a tree T rooted at c with all its leaves comprised of configurations satisfying g. Analogous to the EFg case, we consider for each i, the local tree $T_i$ resulting from the projection of each global path x of T onto the local computation of $P_i$ along x. Note that due to lock interaction not all paths from the root to a leaf of $T_1$ can be executed in an interleaved fashion with a similar path of $T_2$, and vice versa. Enumerating all pairs of compatible local paths of $T_1$ and $T_2$ and executing them in all allowed interleavings will give us back the tree T. But from the Decomposition Result, we have that a pair of local paths of $T_1$ and $T_2$ can executed in an interleaved fashion if and only if they are acquisition history compatible. In other words, to reconstruct T from $T_1$ and $T_2$, we have to track the acquisition history along each path starting from the root of $T_i$ to its leaves.

A key difficulty is that since the depth of tree $T_i$ could be unbounded, the number of local paths of $P_i$ from $c_i$ in $T_i$ could be unbounded forcing us to potentially track an unbounded number of acquisition histories. However, the crucial observation is that since the number of locks in the Dual-PDS system DP is fixed, viz., m, so is the number of all possible acquisition histories ($2^{m(2m+3)}$ in fact). An important consequence is that instead of storing the acquisition history for each path of tree $T_i$, we need only store the different acquisition histories encountered along all paths of the tree. This ensures that the set of acquisition histories that need be tracked is finite and bounded and can therefore be tracked as part of the control state of PDS $P_i$. Thus an augmented control state of $P_i$ is now of the form ($c_i$,AH), where AH={$ah_1$, ..., $ah_k$} is a set of acquisition history tuples and $c_i$ is a control state of $P_i$. Each acquisition history tuple $ah_j$ is of the form ($bah_1$, ..., $bah_m$, $fah_1$, ..., $fah_m$), where $bah_j$ and $fah_j$ track, respectively, the backward and forward acquisition history tuples of lock $l_j$.

For model checking AFp, we make use of a pre*-closure algorithm based on the fixpoint characterization AFf=μY· f∨AXY. Note that since the given Dual-PDS system has infinitely many states, by naively applying the above procedure we are not guaranteed to terminate. We now propose a novel way to perform pre*-closures over regular sets of configurations augmented with acquisition history sets. These regular sets are now represented as LMAPs accepting configurations augmented with acquisition history sets instead of merely acquisition histories and are thus referred to as Augmented LMAPS (A-LMAPs). Using A-LMAPs enables us to carry out this pre*-closure efficiently.

Computing AFf. Let $M_0=(M_{01},M_{02})$ be an A-LMAP accepting the set of regular configurations satisfying f. To start with, the fah and bah entries of each acquisition tuple are set to Ø. Starting at $M_0$, we construct a finite series of A-LMAPs $M_0, \ldots, M_p$ resulting in the A-LMAP $M_p$ accepting the set of configurations satisfying AFf. We denote by $\rightarrow_k$ the transition relation of $M_k$. Then for every $k \geq 0$, $M_{k+1}$ is obtained from $M_k$ by conserving the set of states and adding new transitions as follows: Let $c_1=(c_1,AH_1)$ and $c_2=(c_2,AH_2)$ be a pair of acquisition-history compatible augmented control configurations of $P_1$ and $P_2$, respectively. We need to check whether all enabled successors from the augmented control state $(c_1,c_2)$ of DP are accepted by $M_k$. Let $tr_{i1}, \ldots, tr_{il_i}$ be all the local transitions of $P_i$ that can be fired by DP from $(c_1,c_2)$ We check for each transition $tr_{ij}:c_i \rightarrow c_{ij}$, whether one of the following conditions holds

- if $tr_{ij}$ is an internal transition of $P_i$ of the form $\langle c_i, \gamma \rangle \rightarrow \langle c_{ip}, u \rangle$ then in $M_k=(M_{k1},M_{k2})$, for some $w \in \Gamma_1^*$, the augmented configuration $\langle c_{ij},AH_i \rangle,uw \rangle$ is accepted by, viz., there is a path x of $M_{ki}$ starting at $(c_{ij},AH_i)$ and leading to a final state of $M_{ki}$ such that there is a prefix x' of x leading from $(c_{ij},AH_i)$ to a state $(c'_{ij},AH_i)$, say, such that x' is labeled with u.
- if $tr_{ij}$ is the locking transition $c_i^{acquire(l)} c_{ij}$, then there is an accepting path in $M_{ki}$ starting at $(c_{ij},AH_i)$, where $AH_i=\{ah_{im}|ah_{im} \in AH_i\}$ with $ah_{im}$ obtained from $ah_{im}$ by factoring in the acquisition of l. We remove the fah for lock l (since in the backward step l has now been released) and add l to the fah of every other lock. Similarly l is added to the bah of every other lock initially held by $P_i$ when starting from $M_0$ and the bah of l is dropped if it was not held initially when starting from $M_0$.
- if $tr_{ij}$ is the unlocking transition $c_i^{release(l)} c_{ij}$, then the there is an accepting path in $M_{ki}$ starting at $(c_{ij},AH_i)$, where $AH_i=\{ah_{im}|ah_{im} \in AH_i\}$ with $ah_{im}$ obtained from $ah_{im}$ by adding an empty FAH-entry, for l (since in the backward step l has now been acquired).

If for each i, at least one of the above conditions holds for each of the transitions $tr_{i1}, \ldots, tr_{il_i}$, then in $M_{(k+1)i}$, for each $tr_{ij}$, we add an internal transition from state $c_i$ in $M_i$ to $c'_i=(c_{ij},AH_i)$ or a transition labeled with γ to the state $c'_i=(c'_{ij},AH_i)$ accordingly as $tr_{ij}$ is a locking\unlocking transition or an internal transition, respectively. Since in constructing $M_{k+1}$ from $M_k$, we add a new transition to $M_k$ but conserve the state set, we are guaranteed to reach a fixpoint. Then the resulting A-LMAP accepts AFf.

Computing the LMAP accepting AXf. The construction is similar to the one carried out in each step of the above procedure for computing AFf and is therefore omitted.

This completes the formulation of procedures for computing A-LMAPs accepting AXf and AFf leading to the following result.

Theorem 10 (L(X,G) Decidability). The model checking problem for Dual-PDS system DP synchronizing via nested locks is decidable for L(X,G) in polynomial time in the size of the control state of DP and exponential time in the number of locks.

Rendezvous and Broadcasts: Decidability of L(X,G)

In order to get decidability of L(X,G) for PDSs interacting via asynchronous rendezvous, we reduce the problem to the model checking problem for non-interacting Dual-PDS systems for L(X,G) which by theorem 10 is decidable.

Let DP be a given Dual-PDS system comprised of PDSs $P_1$ and $P_2$ interacting via asynchronous rendezvous. Let $P'_i$ be the PDS we get from $P_1$ by replacing each asynchronous send transition of the form

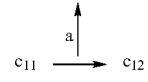

by the sequence of internal transitions $c_{11} \rightarrow c_{a\uparrow} \rightarrow c_{12}$. Similarly, each asynchronous receive transition of the form

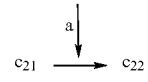

is replaced by the sequence of internal transitions $c_{21} \rightarrow c_{a\downarrow} \rightarrow c_{22}$ Note that $p'_i$ has no rendezvous transitions. Let DP be the Dual-PDS systems comprised of the non-interacting PDSs $P'_1$ and $P'_2$. The key idea is to construct a formula $f_{AR}$ of L(X,G) such that DP $\models$ Ef iff DP $\models$ E(f$\wedge f_{AR}$). The decidability of model checking for L(X,G) then follows from theorem 10.

In order to simulate asynchronous rendezvous, we have to ensure that (i) whenever $P'_1$ and $P'_2$ are in control states $c_{11}$ and $c_{21}$, respectively, then we execute the transitions $c_{21} \rightarrow c_{a\downarrow} \rightarrow c_{11} \rightarrow c_{a\uparrow}, c_{a\downarrow} \rightarrow c_{22}$ and $c_{a\uparrow \rightarrow c12}$ back-to-back, and (ii) whenever $P'_2$ is in local state $c_{21}$, but $P'_1$ is not in $c_{11}$, PDS $P'_2$ blocks. This can be accomplished by ensuring that each state satisfies $f_{AR}=((c_{21} \wedge \neg c_{11} - Xc_{21}) \wedge ((c_{11} \wedge c_{12})$ $X(c_{11} \wedge \alpha_\downarrow) \wedge XX(a_\uparrow \wedge \alpha_\downarrow) \wedge XXX)(c_{22} \wedge \alpha_\uparrow) \wedge XXXX$ $(c_{22} \wedge c_{12}))$. Thus we set $f_{AR}=Gf_{AR}$. The case for broadcasts can be handled similarly. Since pairwise rendezvous is less expressive than asynchronous rendezvous, the decidability of L(X,G) for pairwise rendezvous follows.

Theorem 11 (L(X,G) Decidability). The model checking problem for Dual-PDS system interacting via rendezvous and broadcasts are decidable for L(X,G).

With these underpinnings in place, we may now understand the overall method of the instant application. With reference to FIG. 3, there is shown a flowchart depicting our overall method. More particularly, at block 310 we note that for a given correctness property, i.e., pointer alias, variable constant value, range analysis, a model checking problem is performed. Importantly, and according to the present invention, the computation of automaton is carried out individually on each thread—represented by a push down system—rather than the entire program. This advantageously avoids any state space explosion in the representation of states, either as pairs of automata or summaries.

Other modifications and variations to the invention will be apparent to those skilled in the art. Accordingly, the invention should be only limited by the scope of the claims attached hereto

What is claimed is:

1. A computer-implemented method of soundly analyzing a concurrent multi-threaded computer program for correctness properties specified as Linear Temporal Logic formulae using Lock Constrained Multi-Automata Pairs wherein said multi-threaded computer program comprises multiple threads wherein one or more of said multiple threads synchronize and communicate with one or more of other ones of said multiple threads and wherein said multi-threaded computer program has a set of locations of interest which pertain to a particular property of interest that refers to more than one thread, said method comprising steps of:

by the computer:

augmenting states of the individual threads with backward and forward acquisition history information;

determining a set of reachable states augmented with backward and forward acquisition history information in each one of the individual augmented threads by traversing the individual threads to compute augmented Multi-Automata that store these acquisition histories for all reachable states in threads; and determining simultaneous reachability of certain states in the concurrent program as required by the structure of the temporal logic formula by building a Lock Constrained Multi-automata pair from the augmented Multi-automata computed in the previous step and encoding reachability as a consistency check on the backward and forward acquisition histories as stored in the local states of the augmented Multi-automata.

2. The method of claim 1 further comprising the steps of by the computer:

simplifying the given property into its set of basic operators;

analyzing the multi-threaded program for each individual operator thereby producing a set of analysis results; and combining the results into a set of results for the original property.

3. The method of claim 2 further comprising the step of by the computer checking consistency over states in pairs of automata for each basic operator.

4. The method of claim 1 wherein the states in a thread and/or a property are augmented by the computer depending on the synchronization and communication primitives and the original property.

5. The method of claim 4 wherein threads are augmented by the computer with acquisition histories when locks are used as the primitives for synchronization and communication.

6. The method of claim 5 wherein said acquisition history includes both forward acquisition history and backward acquisition history of the locks.

* * * * *